United States Patent [19]

Egan

[11] Patent Number: 5,189,927
[45] Date of Patent: Mar. 2, 1993

[54] VARIABLE RATIO DRIVE TRANSMISSION

[76] Inventor: Michael J. Egan, 28 Fords Road, Wollongong, NSW 2515, Australia

[21] Appl. No.: 679,012
[22] PCT Filed: May 4, 1989
[86] PCT No.: PCT/GB89/00473
§ 371 Date: Jun. 17, 1991
§ 102(e) Date: Jun. 17, 1991
[87] PCT Pub. No.: WO90/05252
PCT Pub. Date: May 17, 1990

[30] Foreign Application Priority Data

Nov. 8, 1988 [GB] United Kingdom ............... 8826112

[51] Int. Cl.⁵ .................................................. F16C 3/04
[52] U.S. Cl. .................................... 74/602; 74/595; 74/579 E; 123/197.4; 123/90.31
[58] Field of Search ............... 74/570, 595, 600-604; 123/197.1, 197.4, 90.17, 90.31, 90.34

[56] References Cited

U.S. PATENT DOCUMENTS

| | | | |
|---|---|---|---|
| 1,875,180 | 8/1932 | Rider | 74/595 |
| 1,924,562 | 8/1933 | Lower et al. | 74/595 |
| 1,986,549 | 1/1935 | Woolson | 74/596 |
| 2,204,514 | 6/1940 | Schlote | 74/571 |
| 4,078,450 | 3/1978 | Vallejos | 123/197.4 |
| 4,085,628 | 4/1978 | McWhorter | 123/197.4 |
| 4,319,498 | 3/1982 | McWhorter | 123/197.4 |
| 4,467,756 | 8/1984 | McWhorter | 74/595 |
| 4,505,235 | 3/1985 | Mitchell | 123/90.31 |
| 4,622,864 | 11/1986 | Fetouh | 123/197.4 |

FOREIGN PATENT DOCUMENTS

| | | | |
|---|---|---|---|
| 0843452 | 7/1939 | France. | |
| 0857205 | 8/1940 | France. | |
| 0194496 | 9/1967 | U.S.S.R. | 74/595 |
| 0132628 | 9/1919 | United Kingdom. | |

Primary Examiner—David A. Scherbel
Assistant Examiner—Winnie Yip
Attorney, Agent, or Firm—Watson, Cole, Grindle & Watson

[57] ABSTRACT

A continuously variable drive transmission which includes journals and counterweights which are simultaneously displaced in opposite radial directions by operation of a cam keyed to a rotatable operating shaft extending axially through a crankshaft to vary the eccentricities of each connecting rod big-end and thus vary the throw of the crankshaft.

6 Claims, 10 Drawing Sheets

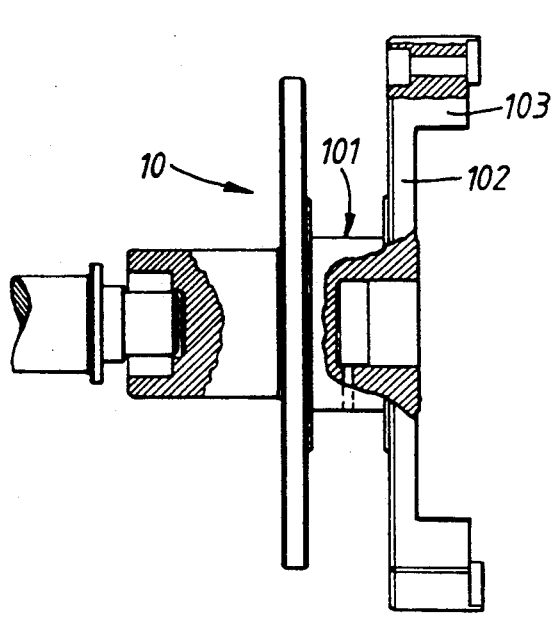
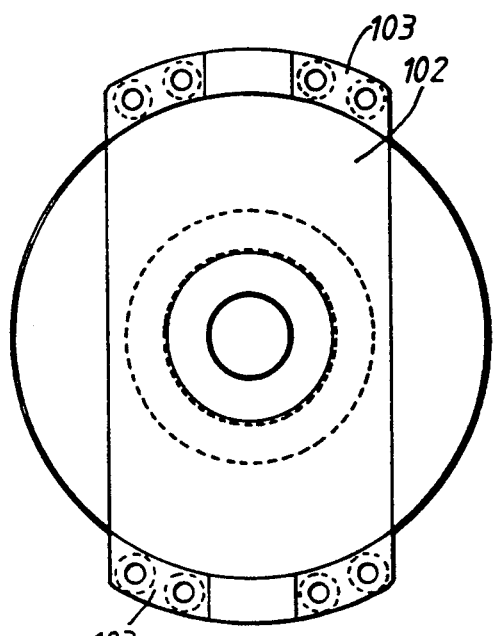
Fig.3A.  Fig.3B.
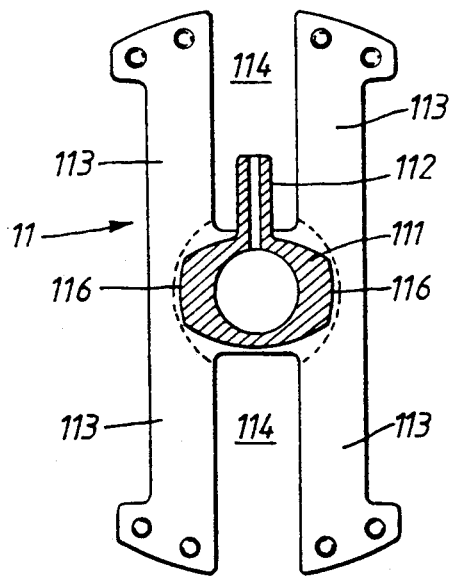
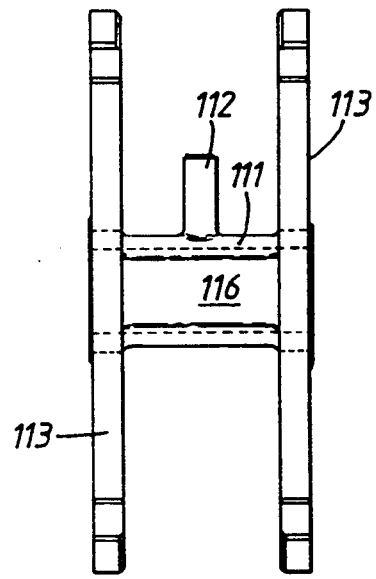
Fig.4A.  Fig.4B.

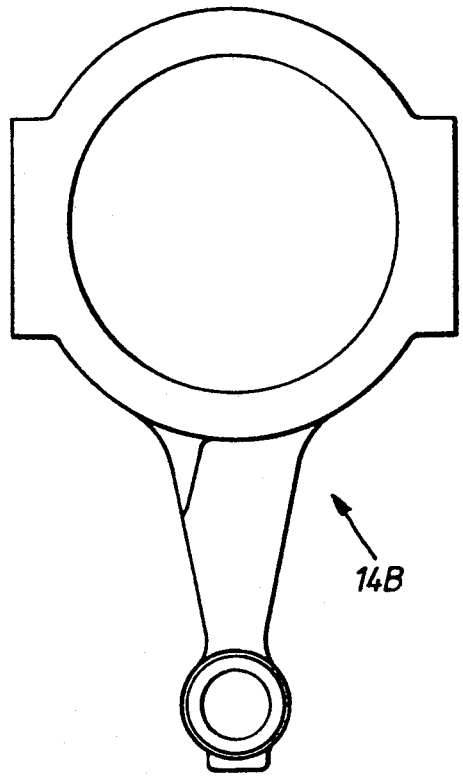
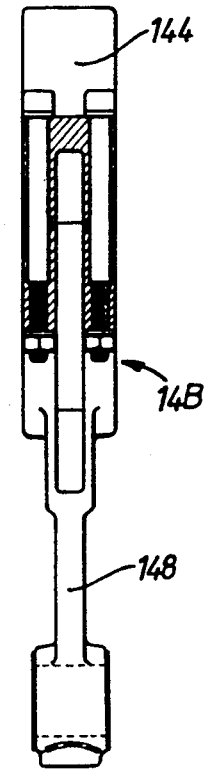
Fig.11A.
Fig.11B.
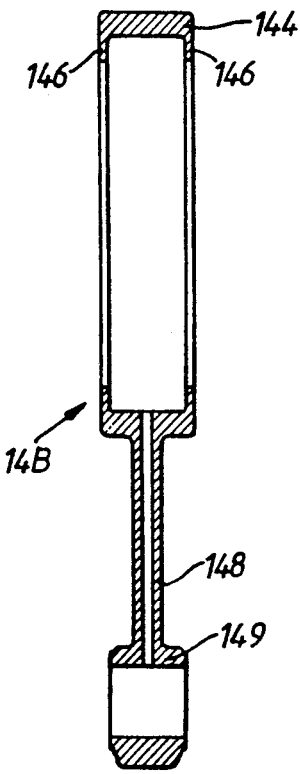
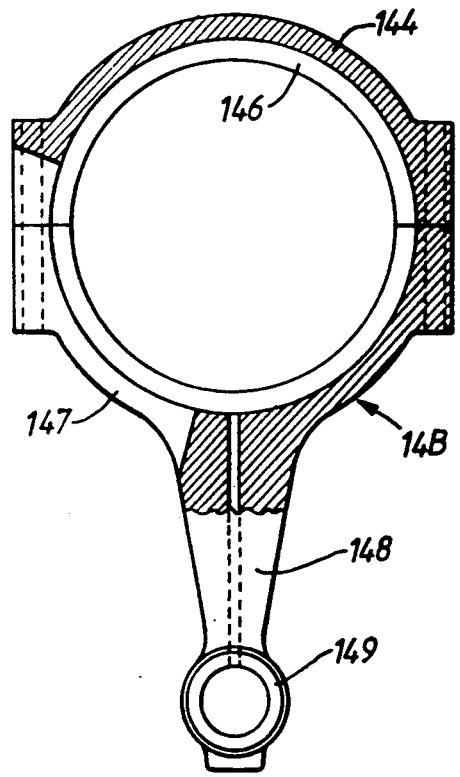
Fig.11C.
Fig.11D.

VARIABLE RATIO DRIVE TRANSMISSION

This invention relates to variable ratio drive transmissions and in particular to variable throw crank drives for incorporation in such transmissions.

British Patent 132628 describes a variable stroke crank drive, comprising a crank shaft having a plurality of axially spaced big-end journals each having at least one connecting-rod (con-rod) mounted thereon through the intermediary of eccentric mounting means, the said means all being adjustable in unison to permit the eccentricity of each con-rod big-end to be adjusted from a minimum value to a maximum value, and a rotatable operating shaft extending axially through the crank shaft and operable, while the crank shaft is running, to vary the eccentricities of the said eccentric mounting means in unison.

The drive disclosed does not, however, provide for preserving dynamic balance and would therefore be liable to substantial vibration at high operating speeds.

The present invention is mainly characterized in that the eccentric mounting means for each con-rod big-end comprises a journal mounted for radial displacement relative to the crank shaft, and that a corresponding counterweight is also mounted for radial displacement relative to the crankshaft, the journal and its counterweight being radially displaceable in opposite directions by cam means fast with the operating shaft and operatively coupled to the said journal and its counterweight. This arrangement provides for automatic counterbalancing of the shaft throughout the range of adjustment of the eccentricity of the eccentric mounting means.

The invention also provides a crank shaft, suitable for use in such a drive, fabricated from a plurality of components to facilitate its production.

These and other features of the invention will appear from the following description of a presently preferred form of drive transmission in accordance with the invention, given with reference to the accompanying drawings.

BRIEF DESCRIPTION OF THE DRAWINGS

FIGS. 3A,3B; 4A,4B; 5A,5B; 6A,6B; 7A,7B; 8A,8B,8C; 9; 10A,10B; and 11A,11B,11C,11D, are sets of views of individual components of the drive transmission;

DETAILED DESCRIPTION OF THE PREFERRED EMBODIMENT

Figure 1:
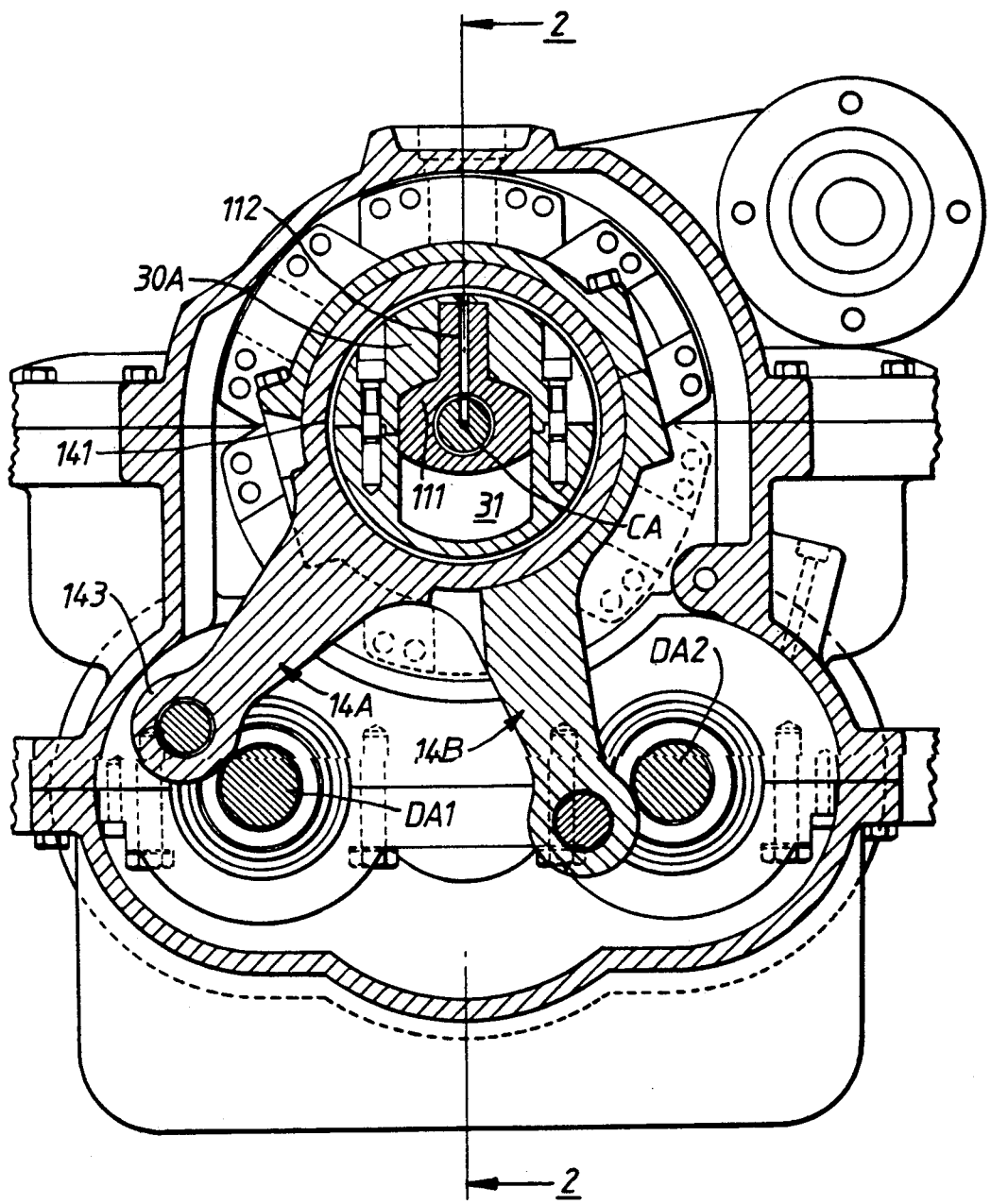
FIG. 1 is a cross-section on the line 1—1 of FIG. 2.

The drive shown in the drawings is a continuously variable transmission for a tractor. It has a main crank axis CA and two parallel driven shafts DA 1 and DA 2. Each of these shafts carries three one-way clutches, in the form of sprag clutches whose outer races are all connected to different respective con-rods each driving its associated sprag-clutch and drive shaft for up to 65° of arc whilst overriding the other two clutches on the same shaft. The two drive shafts are coupled to a common output.

The con-rods all have adjustable throw, and means are provided for adjusting the throws of all six con-rods from zero to maximum value. At zero throw, no drive is transmitted to the driven shafts and at maximum throw, the shafts are driven at their maximum speed relative to the speed of rotation of the crank shaft.

Figure 2:
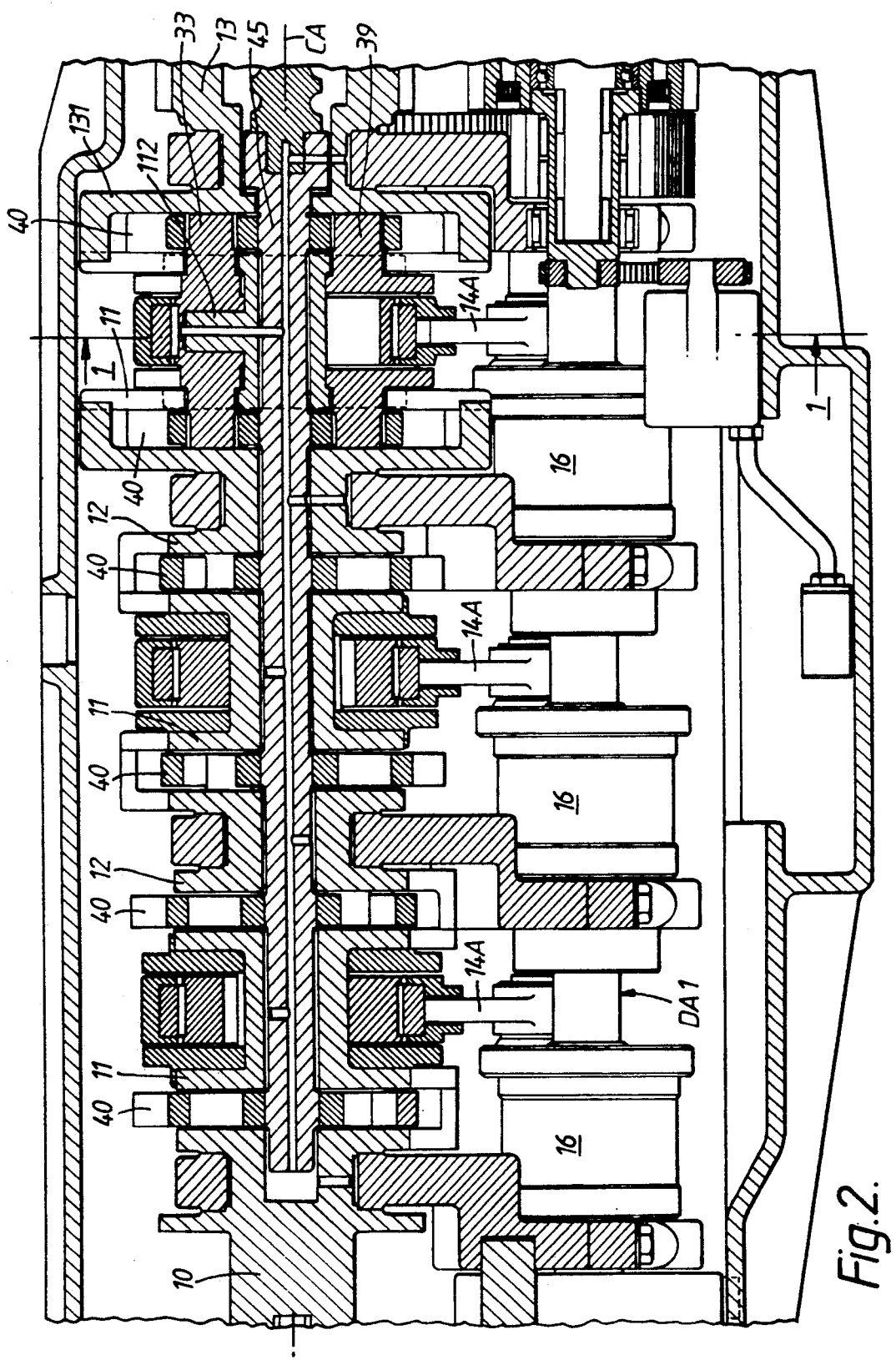
FIG. 2 is a longitudinal cross-section through the axis of the crank on the line 2—2 in FIG. 1.
Figure 2A:
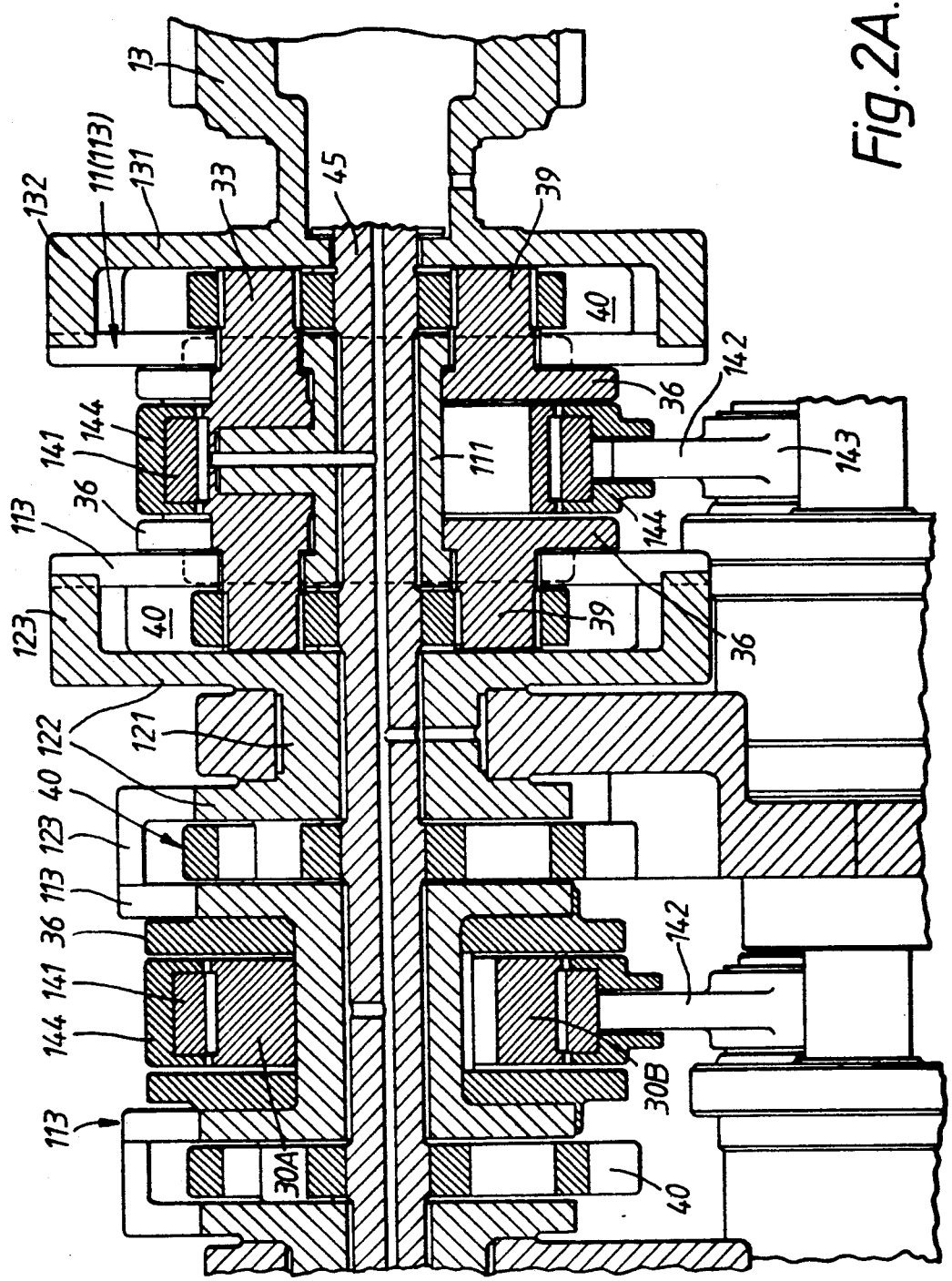
FIG. 2A is a scrap detail from FIG. 2, on a larger scale.
Figure 5A:
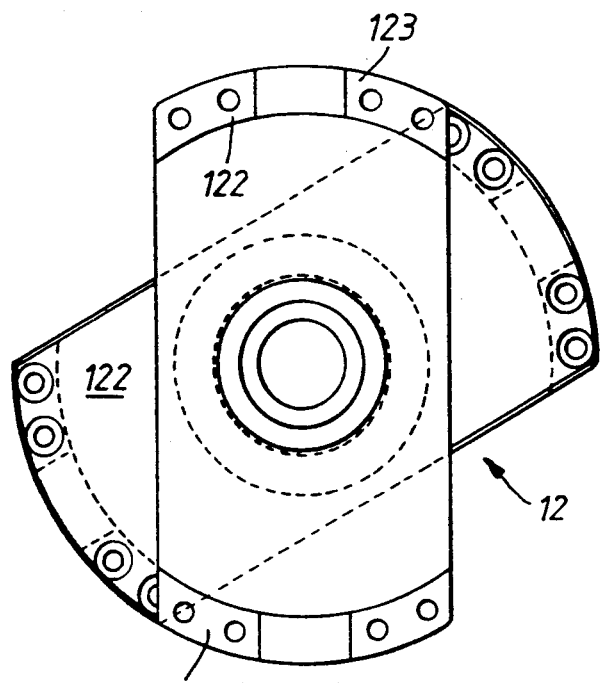
Figure 5B:
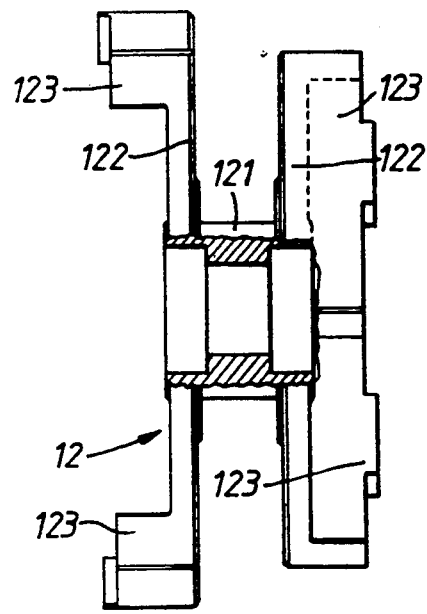
Figure 6A:
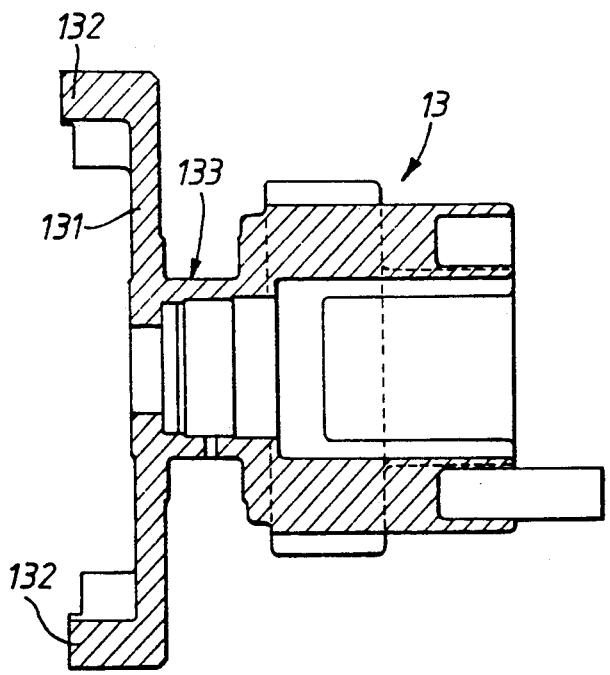
Figure 6B:
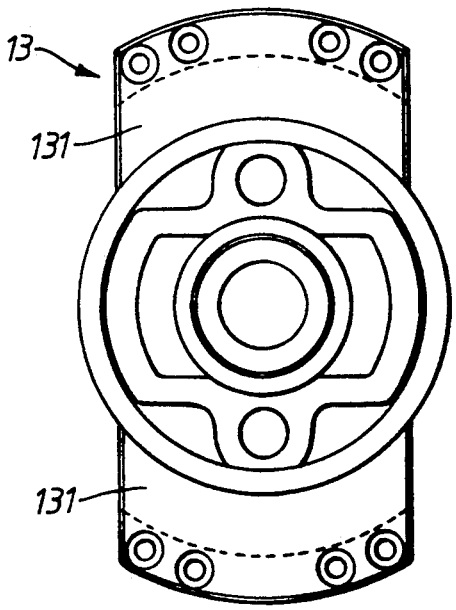

Turning now to the constructions in detail, FIG. 2 shows the length of the crank shaft on its axis CA. The crank shaft is of fabricated construction, comprising a forward end main bearing and cam housing component 10, three journal housings 11, two middle sections 12 alternating axially with the housing 11, and a rear end main bearing and cam housing component 13. These components are rigidly secured together to form the crank shaft proper and as will be explained below, they provide "big-end" journal supports for three pairs of con-rods 14A,14B, three of which can be seen in FIG. 2 connected at their small ends to respective spragclutch outer races 16 on one driven shaft DA 1.

The main components of the crank shaft are illustrated in FIGS. 3A–6B. Briefly, the component 10 has a journal section 101 and a main radial wall 102 terminating at rearwardly directed arcuate flanges 103 for bolting to the adjacent housing 11, illustrated in FIGS. 4,4B. The housing comprises a central, generally tubular body 111 having a radial peg 112 at its mid-length. The side walls of the body 111 are given a slightly convex curved form to constitute guide surfaces 116. At each end, the housing has two parallel, chordally directed legs 113 defining between them guide slots 114. The legs 113 at one end of the first housing are bolted to the flanges 103 of the component 10, and those at the other end are bolted to the adjacent middle section 12, illustrated in FIGS. 5A,5B. This section comprises a tubular body 121 forming a journal received in a fixed bearing, and at each end it has a radial plate 122, the two plates being mirror images of each, but set rigidly at 120° to each other. The outer edges of both plates are formed with outwardly directed arcuate flanges 123 for securing the section to the legs 113 of the adjacent journal housings 11 to either side.

The next housing 11 will, of course be set at 120° to its predecessor, and with the interposition of the second, identical middle section 12 the third housing 11 will be a further 120° out of phase from its predecessor.

The rearmost limbs 113 of the third housing 11 are secured to the component 13 (FIGS. 6A,6B) which provides a rear end main bearing 133 and at its forward end (left hand end as seen in the drawings) it has a main radial wall 131 having forwardly directed arcuate flanges 132 at its opposite ends for attachment to the limbs 113 of the housing 11.

The big-end journals of the crank shaft are mounted in the journal housings 11 for sliding radial movement between a concentric position and a maximum eccentric position.

Figure 7A:
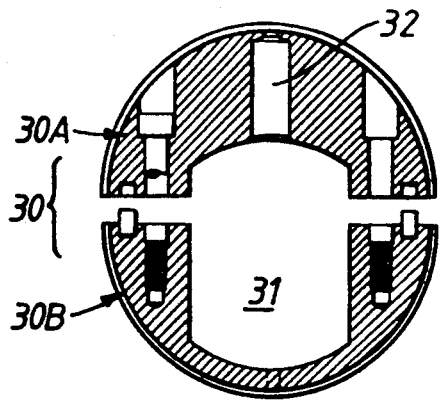
Figure 7B:
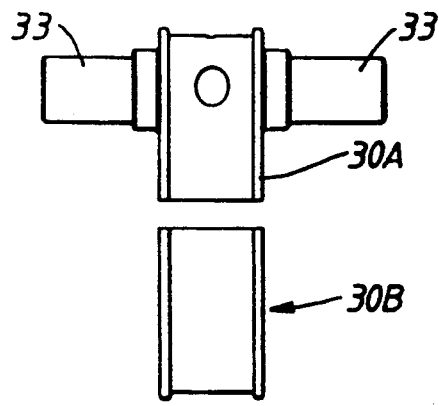

The detail of a big-end journal is illustrated in FIGS. 7A,7B, wherein the journal 130 is seen to be composed of two parts 30A,30B dowelled and screwed together on assembly. The journal has a large central aperture 31 and a radial extension thereof, 32, by which the journal engages over the central body 111 and the peg 112, respectively, the straight sides of the aperture 31 engaging slidingly against the guide surfaces 116. This assembled condition is easily seen in FIG. 1, in which the journal is co axially centred.

Returning to FIGS. 7A,7B, the upper journal part 30A is formed with oppositely projecting, axial drive pins 33 for engagement by operating cams, as described below.

Figure 8A:
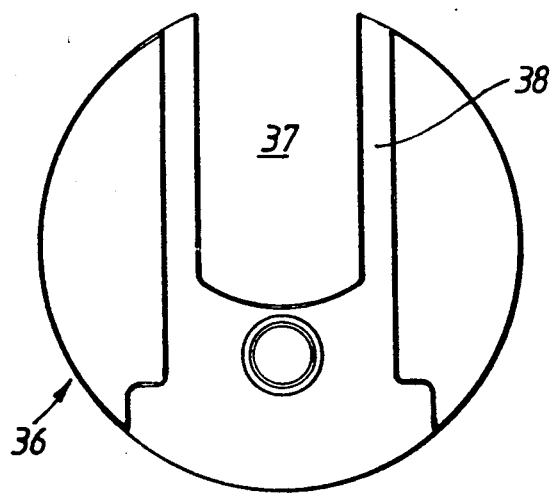
Figure 8B:
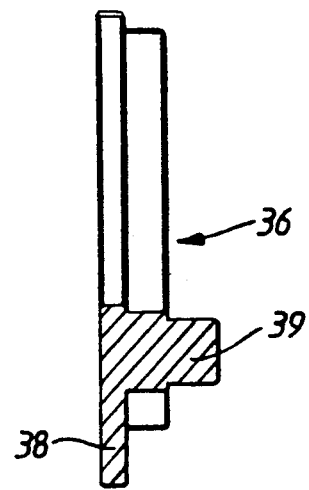
Figure 8C:
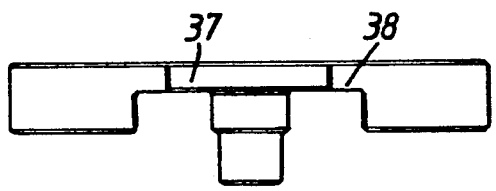

Each journal housing also accommodates a pair of counterweights, of the form illustrated in FIGS. 8A,8B,8C. Each counterweight 36 is of generally C-shaped form, having an elongate slot 37 formed in a central web portion 38 of reduced thickness also adapted to slide over the faces 116 of housing body 111. The weights each have an axially directed drive pin 39 for co-operation with operating cams.

Thus, each housing 11 accommodates between its respective ends, a big-end journal 30, flanked on either side by a counterweight 36. The respective projecting pins 33 and 39 project axially through the slots 114 at both ends of the housing 11, and are guided for radial sliding movement therein by bronze sliding bushes.

Figure 9:
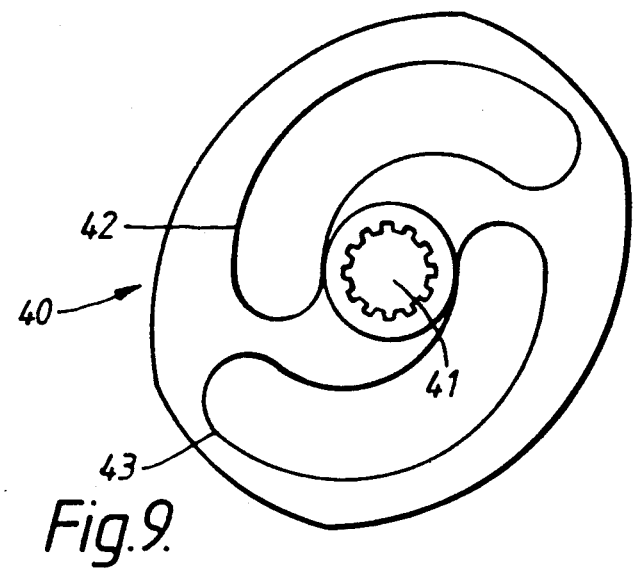

Radial displacement of the journals 30 and concomitant opposing displacement of the counterweights is controlled by operating cams of the form illustrated in FIG. 9. Each cam 40 is of generally plate like form and has a central through hole 41 of splined form. It also has two curved cam slots 42,43 of similar but mirror image profile. In the assembled drive, one slot 42 will receive and guide one of the pins 33 of one journal and one slot 43 will receive the pin 39 of a counterweight 36. There are, therefore, six cams 40 in the illustrated drive, arranged in pairs, one immediately adjacent the axial side faces of each of the journal housings 11, as best seen in FIG. 2, which also shows the central operating shaft 45 extending along the main axis CA and having splined, driving connections to each of the six cams.

Thus it will be appreciated from a consideration of the profiles of the cam slots 42,43, that angular displacement of the shaft 45 relative to the crank shaft will rotate all of the cams 40 in unison, to displace the pins 33 and 39 radially by equal amounts whereby to displace the journals 30 and counterweights 36 equally and oppositely towards or away from a position of zero concentricity.

As previously mentioned and as best seen in FIG. 1, each big-end journal 30 carries two con-rods 14A,14B the construction of which is shown in detail in FIGS. 10A,10B,11A,11B,11C and 11D.

Figures 10A, 10B:
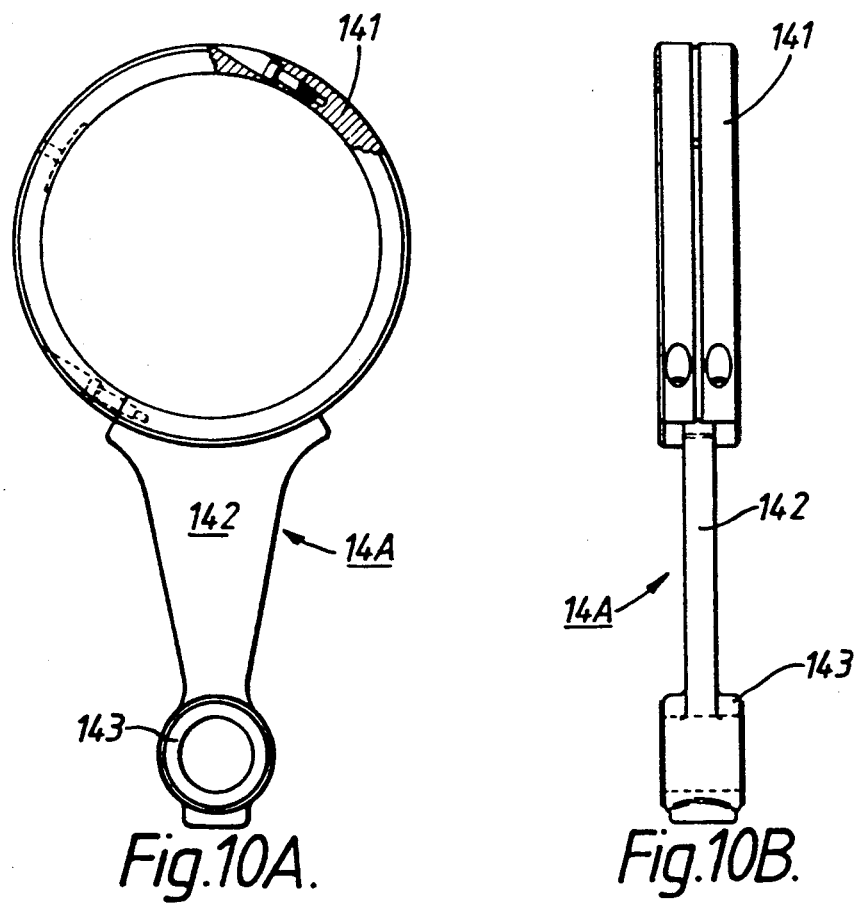

FIGS. 10A and 10B illustrate the form of an inner con-rod 14A of generally conventional form having a cylindrical bearing portion 141, a radial rod 142 and a small end bearing 143. The outer con-rod 14B has a cylindrical bearing portion 144 formed with inwardly directed radial flanges 146 forming an enclosure to receive and capture the bearing portion 141 of the inner con-rod which thus forms a journal for the outer con-rod. The side wall of the portion 144 is interrupted to form a slot 147 of some 94° of arc through which the rod 148 of the outer con-rod, terminating at small end bearing 149.

As previously mentioned, the con-rods are coupled to respective sprag-clutch outer races 16 on drive shafts DA 1 and DA 2 as best seen in FIG. 1.

Figure 12:
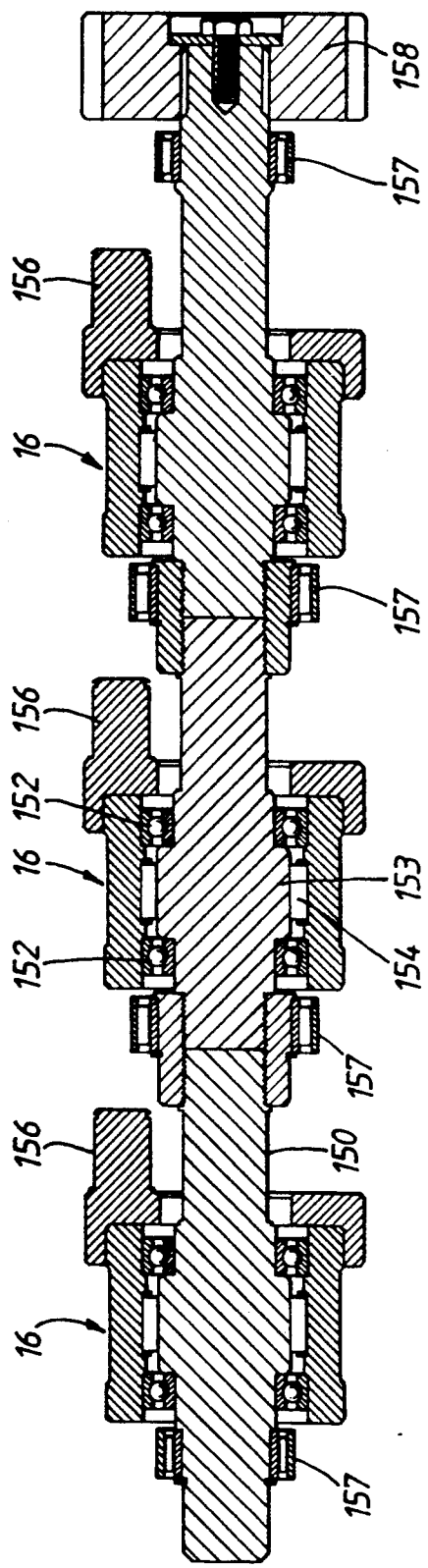
FIG. 12 is an axial section on a drive shaft.

FIG. 12 is a sectional elevation on one of the two drive shafts DA 1,DA 2, which are identical in construction and comprise in each case a drive shaft 150 shown here as constructed in sections for manufacturing convenience but effectively forming a solid shaft. Three sprag clutches are built onto the shaft, each sprag clutch having an outer race 16 supported on the shaft 150 by a pair of ball (or roller) bearings 152. The portion of shaft 150 between each pair of bearings constitutes the inner race 153 of a sprag clutch the sprag elements of which are indicated at 154. Each of the outer races has an offset, axially projecting pin 156 which is received in the small end bearing 143 or 149 of a respective con-rod. The shaft is supported at intervals by rotary bearings 157 and it carries at one end an output drive gear 158. The two shafts DA 1,DA 2 are arranged in parallel with each other and their drive gears 158 are both engaged with a common output gear.

In operation, the crank shaft is coupled to a prime mover, such as the flywheel of an i.c. engine. With the big-end journals centred, as they are for example in FIG. 1, the crank shaft rotates but no motion is imparted to the other con-rods and drive shafts 150 (DA 1,DA 2). In order to produce an output, the control shaft 45 is displaced angularly relative to the crank shaft, both of course continuing to rotate at engine speed. Angular displacement of the shaft 45 correspondingly rotates the cams 40, causing each of the journals 30 to be displaced radially away from its neutral, concentric position. At the same time, the counterweights 36 are displaced in the the opposite radial direction to maintain dynamic balance. According to the degree of eccentricity imparted to the three journals the con-rods 14A and 14B will be correspondingly reciprocated, to effect in turn angular oscillation of the sprag clutch races 16. The amplitude of oscillation of the races 16 may be from 0° to approximately 65°. Because the pair of con-rods on each journal are angularly offset by 60°, they will operate in sequence upon their respective sprag races on the two-shafts 150 and because the three journal housings 11 are offset 120° from each other, the three con-rods 14A will operate 120° out of phase with each other, as will the three con-rods 14B.

With the journals 30 set at maximum eccentricity, each of the sprag races 16 will be driven through 65° in one revolution of the crank shaft, the races on each shaft 150 being driven in turn so that each one drives its shaft 150 while overriding the other two clutches.

The two shafts 150 are also driven 60° out of phase with each other so that all six sprag clutches contribute about 60° of drive in each revolution of the crank shaft, about 180° of revolution being contributed by each drive shaft to the final drive output, which accordingly rotates through about 360° for one revolution of the crank shaft.

Although each sprag clutch outer body is driven through 65° in each revolution of the crank, there is a transmission loss within the clutch of about 10° so that each shaft 150 is positively driven through rather less than 180°, resulting in a maximum drive ratio of less than 1:1. To obtain a drive ration of unity or an overdrive ratio, it is merely necessary to adjust the gear ratio between the gears 158 and the common gear on the output shaft with which they engage.

Figure 13:
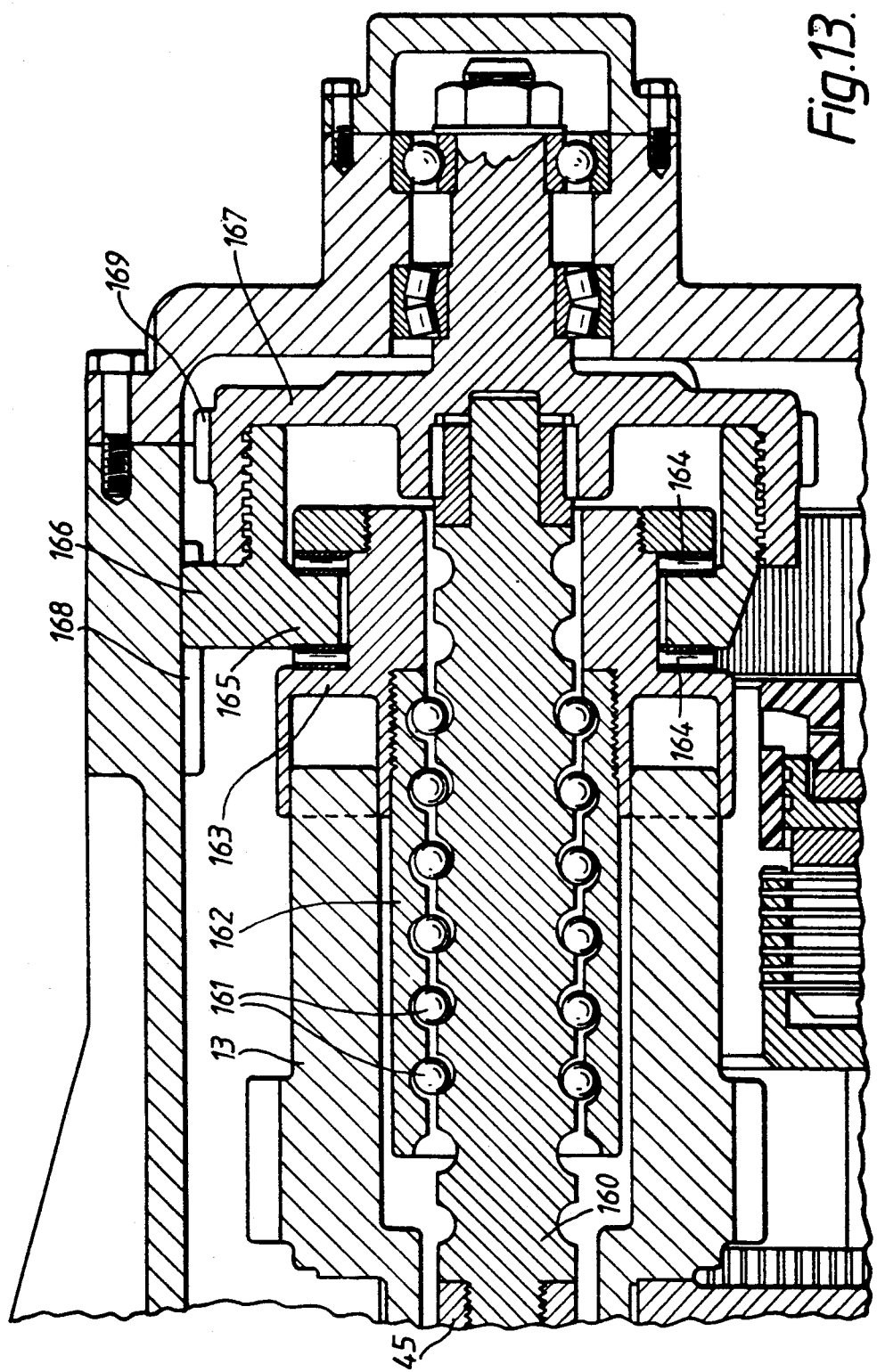
FIG. 13 is a scrap section showing an actuating means for the drive transmission.

Angular adjustment of the control shaft 45 might be effected in various ways but a presently preferred arrangement is illustrated in FIG. 13, which is a scrap-section on the main axis CA, to the right of the drive as seen in FIG. 2 and on a larger scale.

The extreme right hand end of the control shaft 45 is screw-threadedly secured to the end of the inner race 160 of a ball nut and screw having bearing balls 161 and an outer race 162 secured in a support cup 163 arranged in telescopic sliding relationship to the extreme rear end of the rear bearing and housing component 13. The support cup 163 is engaged through thrust races 164 with an internal flange 165 of an actuator 166 which is threaded into a rotary support cup 167 which is rotatable in the main housing and relative to the crank shaft and components fast therewith. The actuator 166 is keyed to the housing at 168 so as to be fast against rotation, but displaceable axially.

Thus, rotation of the cup 167, through a ring gear 169 formed at its outer periphery, will effect corresponding axial displacement of the actuator 166, which carries with it the support cup 163 and outer race 162. Interaction between the helical grooves of the outer race, through the balls 161, and the inner race causes the latter to effect a partial rotation, since it is restrained against axial displacement.

Rotation of the cup 167 may be effected in many ways, in response to manual control or automatically in response to demand from the prime mover or driven equipment.

When the above described drive transmission is employed in a motor vehicle, it is possible to provide an engine braking facility, in spite of the provision of one-way drive means, for example by the provision of clutch means enabling the shafts 150 to transmit drive from the vehicle tail shaft (or equivalent) back to the engine, bypassing the crank of the transmission.

In application of the invention to piston engines the variable throw crank may be incorporated directly in the engine, replacing the usual crank shaft so as to permit direct adjustment of the piston stroke, and thus the compression ratio, of the engine. The particular crank configuration illustrated herein would lend itself particularly well to incorporation in a V-6 diesel engine, for example. In such a case, the ability to adjust the piston stroke is particularly useful since diesel engines typically require a relatively high compression ratio for starting purposes, a medium compression ratio when under moderate load and a low ratio under full load. Only very small adjustments in stroke are required to effect these variations in compression ratio.

Many different applications of the invention will also be possible, as well as modifications to the particular construction described above. For example, other forms of one-way clutch can be employed in place of sprag clutches.

I claim:

1. A variable throw crank drive, comprising a crankshaft having a plurality of axially spaced big-end journals, each having at least one connecting-rod, (con-rod) mounted thereon through the intermediate of eccentric mounting means, said means all being adjustable in unison to permit the eccentricity of each con-rod big-end to be adjusted from a minimum value to a maximum value, and a rotatable operating shaft extending axially through the crankshaft and operable, while the crankshaft is running, to vary the eccentricities of said eccentric mounting means in unison, wherein the eccentric mounting means for each con-rod big-end comprises a journal mounted for radial displacement relative to the crankshaft, and wherein a corresponding counterweight is also mounted for radial displacement relative to the crankshaft, the journal and its counterweight being radially displaceable in opposite directions by cam means fast with the operating shaft and operatively coupled to said journal and its counterweight.

2. A crank drive according to claim 1, wherein each said counterweight comprises a pair of mirror image components mounted on the crankshaft on either side of said journal, and the cam means comprises an identical pair of cams, each of which is coupled to respective ones of the counterweight components and to the journal.

3. A crank drive according to claim 2, wherein that each said cam (40) is formed with two curved cam slots (42,43) engaged respectively by axially directed drive pins (33,39) on the journal and the counterweight component.

4. A crank drive according to claim 1, wherein each said connecting rod has its small end coupled to an input member of a one-way clutch whose output member is drivingly fast to an output shaft (DA1, DA2).

5. A crank drive according to claim 4, wherein two parallel output shafts (DA1 and DA2) are provided, each drivingly coupled to a plurality of said one-way clutches and wherein each said journal (30) carries a pair of said con-rods (14A, 14B) coupled to respective one-way clutches on the respective output shafts.

6. A variable throw crank drive, comprising a crankshaft having a plurality of axially spaced big-end journals, each having at least one connecting-rod (con-rod) mounted thereon through the intermediate of eccentric mounting means, said means all being adjustable in unison to permit the eccentricity of each con-rod big-end to be adjusted from a minimum value to a maximum value, and an operating shaft extending axially through the crankshaft and operable, while the crankshaft is running, to vary the eccentricities of said eccentric mounting means in unison, wherein said crankshaft is of fabricated construction, comprising a plurality of journal housings alternating with interconnecting sections secured to the respective journal housings, said journal housings each comprising an axial, tubular section concentric with the crank axis and end walls set in radial planes at the ends of the tubular section and defining between them a gap to receive eccentric mounting means, and said interconnecting sections each comprising a tubular central section concentric with the crank axis and having at each end thereof a radially extending end wall, said end walls being offset angular with respect to each other and each being secured to the adjacent end wall of the adjacent journal housing.

* * * * *